United States Patent
Granger et al.

(10) Patent No.: US 10,261,340 B2
(45) Date of Patent: Apr. 16, 2019

(54) METHOD FOR PRODUCING A CUSTOMIZED PROGRESSIVE OPHTHALMIC LENS

(71) Applicant: Essilor International, Charenton le Pont (FR)

(72) Inventors: Bérangère Granger, Charenton le Pont (FR); Sébastien Fricker, Charenton le Pont (FR)

(73) Assignee: Essilor International, Charenton le Pont (FR)

(*) Notice: Subject to any disclaimer, the term of this patent is extended or adjusted under 35 U.S.C. 154(b) by 31 days.

(21) Appl. No.: 15/301,434

(22) PCT Filed: Mar. 31, 2015

(86) PCT No.: PCT/EP2015/057133
§ 371 (c)(1),
(2) Date: Oct. 3, 2016

(87) PCT Pub. No.: WO2015/150432
PCT Pub. Date: Oct. 8, 2015

(65) Prior Publication Data
US 2017/0023799 A1 Jan. 26, 2017

(30) Foreign Application Priority Data
Apr. 3, 2014 (EP) .................... 14163433

(51) Int. Cl.
*G02C 7/02* (2006.01)
*G02C 7/06* (2006.01)
*G02C 13/00* (2006.01)

(52) U.S. Cl.
CPC ............. *G02C 7/027* (2013.01); *G02C 7/025* (2013.01); *G02C 7/028* (2013.01); *G02C 7/065* (2013.01); *G02C 13/005* (2013.01)

(58) Field of Classification Search
CPC ........ G02C 7/024; G02C 7/025; G02C 7/027; G02C 7/065; G02C 7/028; G02C 7/06; G02C 7/061
(Continued)

(56) References Cited

U.S. PATENT DOCUMENTS

| 6,074,061 A * | 6/2000 | Miura ................... G02C 7/061 351/159.42 |
| 6,074,062 A | 6/2000 | Morris |

(Continued)

FOREIGN PATENT DOCUMENTS

| EP | 1 291 633 | 3/2003 |
| EP | 2 224 276 | 9/2010 |
| GB | 2 130 391 | 5/1984 |

*Primary Examiner* — Jordan M Schwartz
(74) *Attorney, Agent, or Firm* — Oblon, McClelland, Maier & Neustadt, L.L.P.

(57) ABSTRACT

A method for producing a customized progressive ophthalmic lens intended for a wearer having a prescription for a wearer's eye corresponding to said lens, the method comprising the following steps: a) providing an initial progressive ophthalmic lens design having a meridian line; b) providing binocular convergence data for the wearer; and c) modifying the initial design so that the meridian line is laterally shifted in position with respect to said initial design, for matching the convergence data provided at step b), for said prescription, and the modified design as resulting from step c) is used for the customized lens, wherein step b) comprises the following substeps: b1) providing a visual stimulus in a sagittal plane of the wearer; and b2) moving the visual stimulus within the sagittal plane between a predetermined maximum distance and a predetermined minimum distance.

13 Claims, 15 Drawing Sheets

(58) Field of Classification Search
USPC ............. 351/159.06, 159.42, 159.74, 159.75
See application file for complete search history.

(56) References Cited

U.S. PATENT DOCUMENTS

| | | | |
|---|---|---|---|
| 6,318,859 B1 | 11/2001 | Baurdart et al. | |
| 2011/0013137 A1* | 1/2011 | Kitani ................ | G01M 11/0228 351/159.42 |
| 2011/0184830 A1 | 7/2011 | Guilloux et al. | |
| 2012/0105801 A1* | 5/2012 | Yamakaji ............... | G02C 7/061 351/159.76 |
| 2013/0335699 A1* | 12/2013 | De Rossi ............... | G02C 7/025 351/159.42 |
| 2018/0004010 A1* | 1/2018 | Kaga ...................... | G02C 7/061 |

* cited by examiner

METHOD FOR PRODUCING A CUSTOMIZED PROGRESSIVE OPHTHALMIC LENS

RELATED APPLICATIONS

This is a U.S. national stage application under 35 USC § 371 of International application No. PCT/EP2015/057133 filed on Mar. 31, 2015. This application claims the priority of European application no. 14163433.7 filed Apr. 3, 2014, the entire content of which is hereby incorporated by reference.

TECHNICAL FIELD OF THE INVENTION

The invention relates to a method for producing a customized progressive ophthalmic lens, and to a customized progressive ophthalmic lens directly obtained with such a method.

BACKGROUND OF THE INVENTION

Current design of ophthalmic lenses and particularly of progressive lenses does not take into account the natural convergence ability specific to each individual. It supposes indeed that the object accommodation plane perfectly corresponds to the convergence plane.

However, it is not rare to observe a shift between these two planes due to a delay of convergence for example. This shift can lead to visual fatigue and discomfort symptoms, such as blurred vision and headaches for example.

Dynamic measurement of convergence amplitude enables to quantify the natural ability of an individual and to characterize such a shift. Besides, it can also highlight an oculomotor dyssynergia, one eye being faster than the other.

Starting from this situation, an object of the present invention consists in efficiently taking into account the existence of a difference between the convergence plane and the object accommodation plane such as a convergence delay when designing a progressive surface.

SUMMARY OF THE INVENTION

For meeting this object or others, one aspect of the present invention is directed to a method for producing a customized progressive ophthalmic lens intended for a wearer having a prescription for a wearer's eye corresponding to said lens, the method comprising the following steps:
  a) providing an initial progressive ophthalmic lens design having a meridian line;
  b) providing binocular convergence data for the wearer; and
  c) modifying the initial design so that the meridian line is laterally shifted in position with respect to said initial design, for matching the convergence data provided at step b), for said prescription,
  and the modified design as resulting from step c) is used for the customized lens,
    wherein step b) comprises the following substeps:
    b1) providing a visual stimulus in a sagittal plane of the wearer; and
    b2) moving the visual stimulus within the sagittal plane between a predetermined maximum distance and a predetermined minimum distance.

The spatial profile of the meridian line of a progressive ophthalmic lens is adapted according to the actual convergence ability of the wearer, thus improving the congruence of the visual fields and therefore increasing the visual comfort of the wearer.

According to an embodiment of the invention, step b) also comprises the following substeps:
  b3) determining, for at least one distance of the visual stimulus between the predetermined maximum and minimum distances, an azimuth angle existing for an ocular axis of the wearer's eye when the wearer is looking at the visual stimulus located at said visual stimulus distance; and
  b4) calculating, for each azimuth angle determined at step b3), a convergence distance.

Then, the assignment of each convergence distance to the corresponding visual stimulus distance forms the convergence data used in step c).

Embodiments of the invention may possibly further include one or more of the following features:
  the meridian line is shifted in step c) so as to intersect the ocular axis of the wearer's eye when the wearer is looking at the visual stimulus located at said visual stimulus distance, and the initial design after modification at step c) produces for said visual stimulus distance a mean refractive power initially produced at a gaze direction intersecting the meridian line, by the initial design before modification at step c) and for said visual stimulus distance;
  substep b3) is carried out for a plurality of visual stimulus distances between the predetermined maximum and minimum distances;
  substep b3) is carried out with the wearer being devoid of ophthalmic lens, and step c) includes taking into account a gaze direction deviation produced by the progressive ophthalmic lens when matching the prescription;
  a height of the visual stimulus in the sagittal plane varies as a function of at least said visual stimulus distance;
  the predetermined maximum distance is substantially equal to 2 m and the predetermined minimum distance is substantially equal to 20 cm;
  the visual stimulus is moved at a constant speed during substep b2); the constant speed of the visual stimulus allows improving the measurement repeatability.
  the visual stimulus is moved at a speed comprised between 0.05 m/s and 0.3 m/s; this speed range enables the use of the convergence in natural conditions.
  step c) comprises implementing an optimization process for shifting the meridian line laterally from the initial design;
  step c) comprises the following substeps:
  c1) for the initial design, obtaining respective distributions for a mean refractive power $PPO(\alpha, \beta)$ and a module of resulting astigmatism $ASR(\alpha, \beta)$;
  c2) from said distributions, and for a plurality of gaze directions intersecting the meridian line as existing before step c), at lowering angles $\alpha$, obtaining azimuth angles $\beta_{mer}(\alpha)$;
  c3) respectively for said gaze directions, determining target azimuth angle values based on the convergence data provided at step b);
  c4) based on the initial design, forming a target design comprising, for a plurality of gaze directions, at least one of the following values:
    a mean refractive power $PPO_{target}(\alpha, \beta)$ such that $PPO_{target}(\alpha, \beta)=PPO(\alpha, \beta-\beta_{mer\_target}(\alpha)+\beta_{mer}(\alpha))$; and
    a module of resulting astigmatism $ASR_{target}(\alpha, \beta)$ such that $ASR_{target}(\alpha, \beta)=ASR(\alpha, \beta-\beta_{mer\_target}(\alpha)+\beta_{mer}(\alpha))$; and c5) optimizing a test lens design with respect to the target design, and the test lens design as resulting from optimization forming the modified design;

the meridian line of the initial design is determined from a set of gaze directions through a progressive ophthalmic lens which is provided with said initial design, where a module of resulting astigmatism is minimum when varying an azimuth angle β at constant lowering angle α;

the method further comprises a step of d) manufacturing the customized progressive ophthalmic lens based on the customized lens design; and the wearer has a break value lower than or equal to a predetermined threshold.

Another aspect of the present invention is directed to a method for producing a customized pair of progressive ophthalmic lenses intended for a wearer having a prescription for each eye, wherein a method as described above is performed for each lens of the pair separately.

Conveniently, the methods of the invention may be implemented using computer means.

Another aspect of the present invention is directed to a customized progressive ophthalmic lens directly obtained with a method as mentioned above.

BRIEF DESCRIPTION OF THE DRAWINGS

These and other features and advantages of the invention will become apparent from the detailed specification below, which is provided only for illustration purpose without inducing any limitation, and based on the appended drawings now listed.

Same notations used in different ones of these Figures have same meanings.

Definitions

The following definitions are provided to describe the present invention.

"Prescription data" are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean refractive power for each eye for proximate (near) vision is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A.

Figure 1:
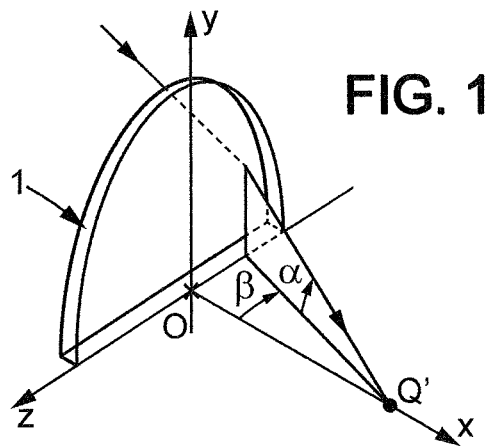
FIGS. 1 and 2 show, diagrammatically, optical systems of eye and lens.
Figure 2:
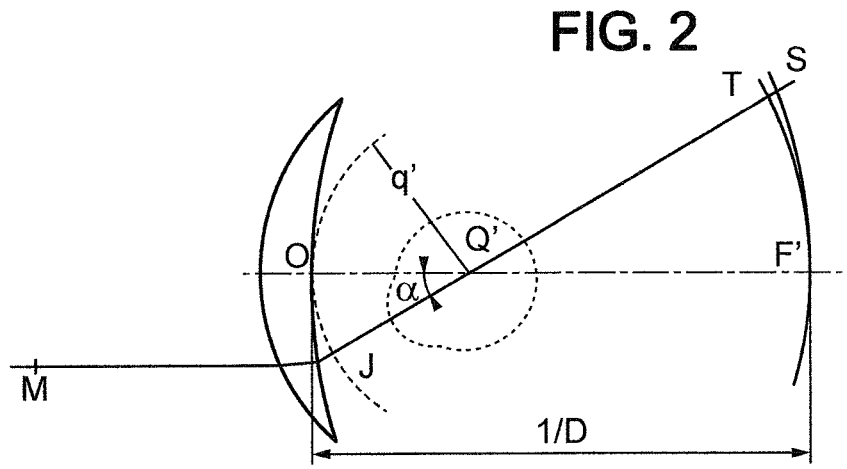

A "gaze direction" can be identified by a couple of angle values (α,β), wherein said angles values are measured with regard to reference axes centered on the center of rotation of the eye (CRE). More precisely, FIG. 1 represents a perspective view of such a system illustrating parameters α and β used to define a gaze direction. FIG. 2 is a view in the vertical plane parallel to the antero-posterior axis of the wearer's head and passing through the center of rotation of the eye in the case when the parameter β is equal to 0. The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze direction. This axis cuts the front surface of the lens on a point called the fitting cross, which is present on lenses to enable the positioning of lenses in a frame by an optician. The fitting cross corresponds to a lowering angle α of 0° and an azimuth angle β of 0°. The point of intersection of the rear surface of the lens and the axis Q'F' is the point O. O can be the fitting cross if it is located on the rear surface. A vertex sphere, of center Q', and of radius q', which is intercepting the rear surface of the lens in a point of the horizontal axis. As examples, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J (see FIG. 2) of the vertex sphere; the angle β is the angle formed between the axis Q'F' and the projection of the straight line Q'J on the horizontal plane comprising the axis Q'F'; this angle appears on the scheme on FIG. 1. The angle α is the angle formed between the axis Q'J and the projection of the straight line Q'J on the horizontal plane comprising the axis Q'F'; this angle appears on the scheme on FIGS. 1 and 2. A given gaze view thus corresponds to a point J of the vertex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear focal length of the lens.

On the lens, for each gaze direction (α, β), a refractive power $PPO_{\alpha,\beta}$, a module of astigmatism $Ast_{\alpha,\beta}$ and an axis $Axe_{\alpha,\beta}$ of of this astigmatism, and a module of resulting (also called residual or unwanted) astigmatism $Asr_{\alpha,\beta}$ are defined.

"Ergorama" is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

The optical power is also called refractive power

By analogy with the case of a thin lens, it can therefore be defined, for a given gaze direction and for a given object proximity, i.e. for a point of the object space on the corresponding light ray, an optical power PPO as the sum of the image proximity and the object proximity.

$$PPO = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens.

Figure 3:
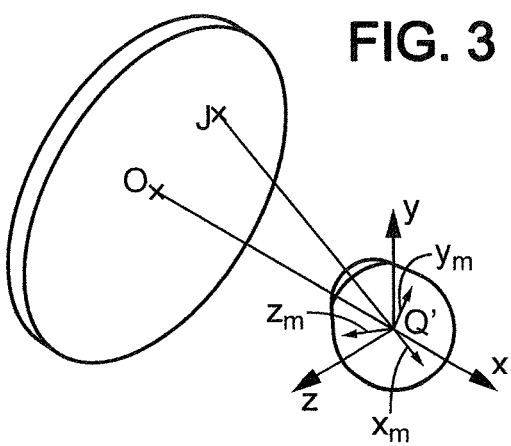
FIG. 3 shows a ray tracing from the center of rotation of the eye.

FIG. 3 represents a perspective view of a configuration wherein the parameters α and β are non-zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is orientated from the lens towards the eye. The y axis is vertical and orientated upwardly. The z axis is such that the frame {x, y, z} is orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. For simplicity, the term 'lens' is used in the description but it has to be understood as the 'ergorama-eye-lens system'.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

DETAILED DESCRIPTION OF THE DRAWINGS

Figure 4:
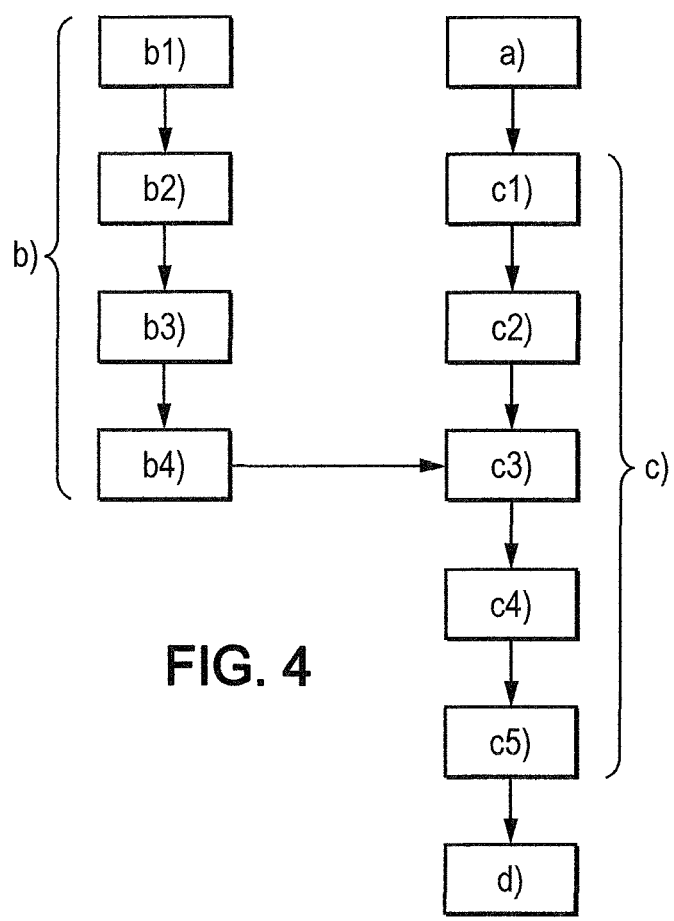
FIG. 4 is a diagram illustrating different steps of a method according to an embodiment of the invention.

FIG. 4 illustrates different steps of a method according to the invention for producing a customized progressive ophthalmic lens intended for a wearer having a prescription for a wearer's eye corresponding to said lens.

As mentioned above, the invention aims at adjusting the spatial profile of the meridian line of the lens according to the real convergence capacity of the wearer in order to facilitate the vergence movements and improve the binocular performance.

Therefore, the method comprises a step of b) providing binocular convergence data for the wearer by measuring the convergence path of the wearer.

To this end, step b) comprises a substep of b1) providing a visual stimulus in a sagittal plane of the wearer.

Advantageously, the visual stimulus is a point stimulus. It may be either an actual object or light source, or a virtual one produced by an appropriate optics.

Figure 5:
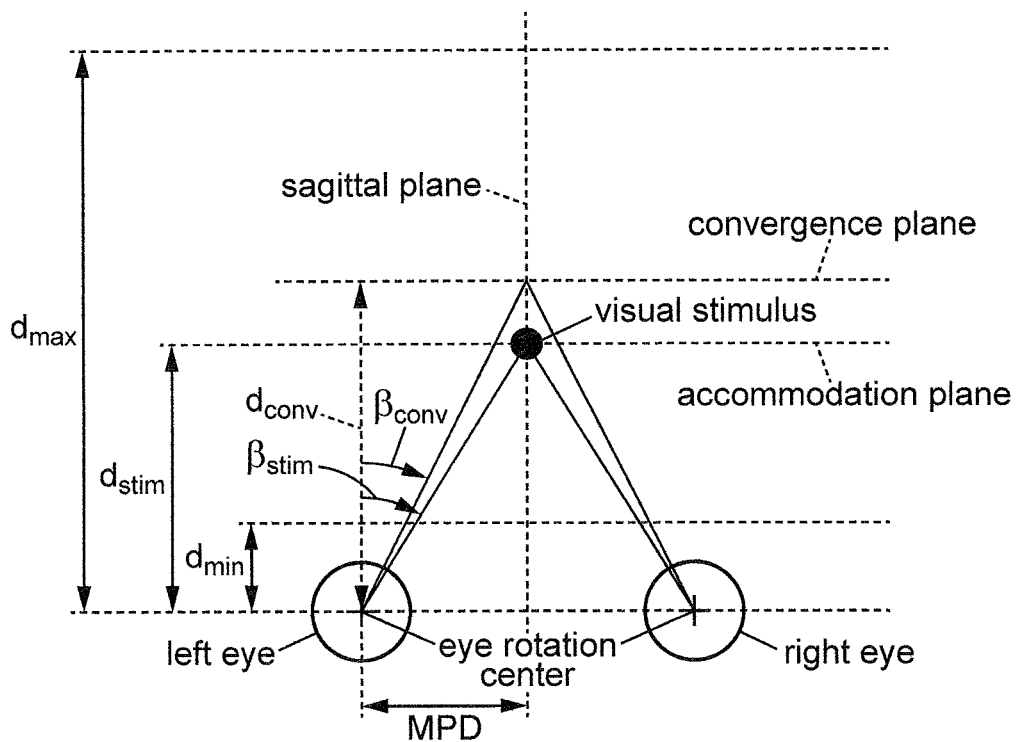
FIG. 5 is a schematic view showing the real convergence of a wearer having a delay of convergence.

As shown on FIG. 5, the wearer who suffers from a convergence delay does not converge in an accommodation plane normal to the sagittal plane and where the visual stimulus is located, but converges slightly behind this accommodation plane, in a so-called convergence plane also normal to the sagittal plane.

On this Figure, both eyes of the wearer are illustrated to converge similarly, namely with the same convergence angle $β_{conv}$. However, this is not always the case and both eyes can converge differently from each other, with respective convergence angles which can be different. This is why, when producing a customized pair of progressive ophthalmic lenses intended for a wearer having a prescription for each eye, the method of the invention is performed for each lens of the pair separately. However, it is to be understood that the step of b) providing binocular convergence data for the wearer by measuring the convergence path of the wearer can be carried out for both eyes simultaneously, meaning in a single operation.

Step b) further comprises a substep of b2) moving the visual stimulus within the sagittal plane between a predetermined maximum distance $d_{max}$ and a predetermined minimum distance $d_{min}$.

For example, $d_{max}$ is substantially equal to 2 m and $d_{min}$ is substantially equal to 20 cm. The origin of the coordinate axes is located at the intersection of the line joining the two eye rotation centers and the sagittal plane.

In an embodiment of the invention, the visual stimulus can be moved at a constant speed $v_{stim}$ during substep b2).

Advantageously, $v_{stim}$ is comprised between 0.05 m/s and 0.3 m/s.

Then step b) comprises a substep of b3) determining, for at least one distance $d_{stim}$ of the visual stimulus between $d_{max}$ and $d_{min}$, an azimuth angle $\beta_{conv}$ existing for an ocular axis of the wearer's eye when the wearer is looking at the visual stimulus located at $d_{stim}$. The ocular axis originates from the eye rotation center.

Substep b3) is for example performed with an eye-tracker device.

Preferentially, substep b3) is carried out for a plurality of visual stimulus distances $d_{stim}$ between $d_{max}$ and $d_{min}$.

In an embodiment of the invention, substep b3) is carried out with the wearer being devoid of ophthalmic lens so as to apply the natural convergence of the wearer.

In a variant, substep b3) may be performed with the wearer being equipped with a progressive ophthalmic lens matching the prescription.

Figure 6:
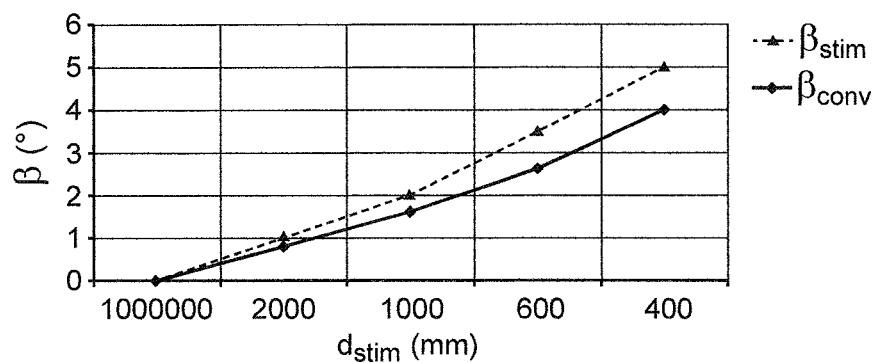
FIG. 6 is a graph representing the evolution of an azimuth angle according to a distance where a visual stimulus is located for a wearer having a convergence delay and for a wearer having no convergence delay.

FIG. 6 is a graph illustrating the evolution of $\beta_{conv}$ as a function of $d_{stim}$. Also represented is the evolution of $\beta_{stim}$ which is an azimuth angle experienced if the wearer has no convergence delay, meaning the wearer actually converging into the accommodation plane.

Figure 7:
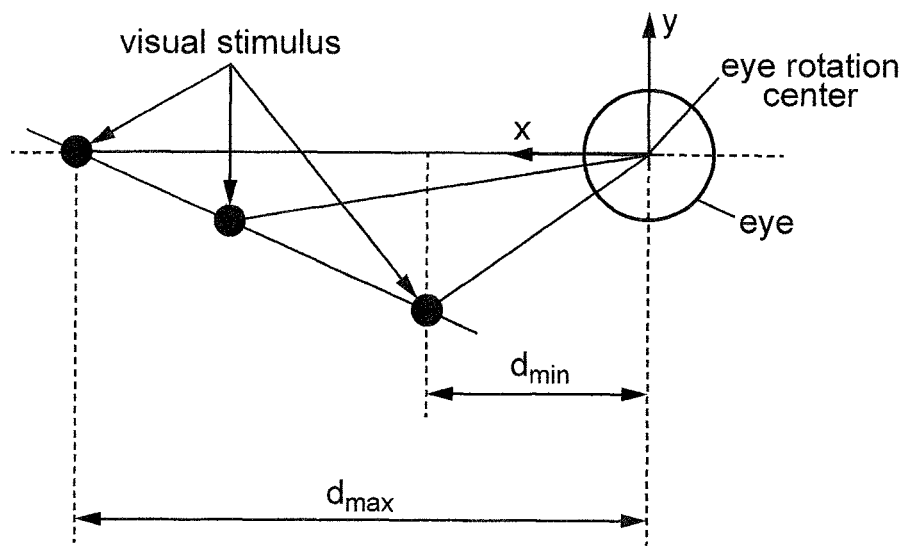
FIG. 7 is a schematic view showing the movement of a visual stimulus in the sagittal plane of a wearer.

It is to be noted that the height of the visual stimulus in the sagittal plane also varies as a function of the visual stimulus distance $d_{stim}$. As shown on FIG. 7, the gaze direction lowers from far vision to near vision. For example, the height y can be equal to 0 for $d_{stim}=d_{max}$ and equal to $-15$ mm for $d_{stim}=d_{min}$.

Step b) further comprises a substep of b4) calculating, for each azimuth angle $\beta_{conv}$ determined at substep b3), a convergence distance $d_{conv}$.

$d_{conv}$ is given the following formula:

$$d_{conv}=MPD/\tan(\beta_{conv})$$

where MPD is the monocular pupillary distance of the wearer for the eye under consideration.

Consequently, the convergence data $d_{conv}(d_{stim})$ are formed by an assignment of each convergence distance $d_{conv}$ to the corresponding visual stimulus distance $d_{stim}$.

Referring back to FIG. 4, the method comprises a step of a) providing an initial progressive ophthalmic lens design having a meridian line ML.

The meridian line ML of the initial design is the location where the resulting astigmatism is minimum within horizontal cross-sections of the initial design, namely when varying an azimuth angle $\beta$ at constant lowering angle $\alpha$.

Alternatively, the meridian line ML position can be defined for each lowering angle $\alpha$ by taking the middle of the two $\beta$ values where resulting astigmatism is equal to 0.5 D. In other words, the meridian line is in the middle of the 0.5 D resulting astigmatism iso-curves for a given $\alpha$ value.

The method further comprises a step of c) modifying the initial design so that the meridian line ML is laterally shifted in position with respect to said initial design, for matching the convergence data $d_{conv}(d_{stim})$ provided at step b), for said prescription, and the modified design as resulting from step c) is used for the customized lens.

Step c) comprises a substep of, c1) for the initial design, obtaining respective distributions for a mean refractive power $PPO(\alpha, \beta)$ and a module of resulting astigmatism $ASR(\alpha, \beta)$, with an ergorama and in standard or customized wearing conditions.

The standard wearing conditions may be the usual ones which are known in the art. In particular, the lens is mounted within a spectacle frame (not shown) so that the back surface of the lens may be located at a distance of about 25.5 mm from the eye rotation center. The pantoscopic angle may be 8°, with the lens top edge leaned ahead with respect to the wearer's face. The wrap angle may have a mean value of about 5°, this angle corresponding to a tilt of the lens about a vertical axis so that the temporal edge of the lens is shifted backwards with respect to its nasal edge. Customized wearing conditions can also be used.

Figure 8A:
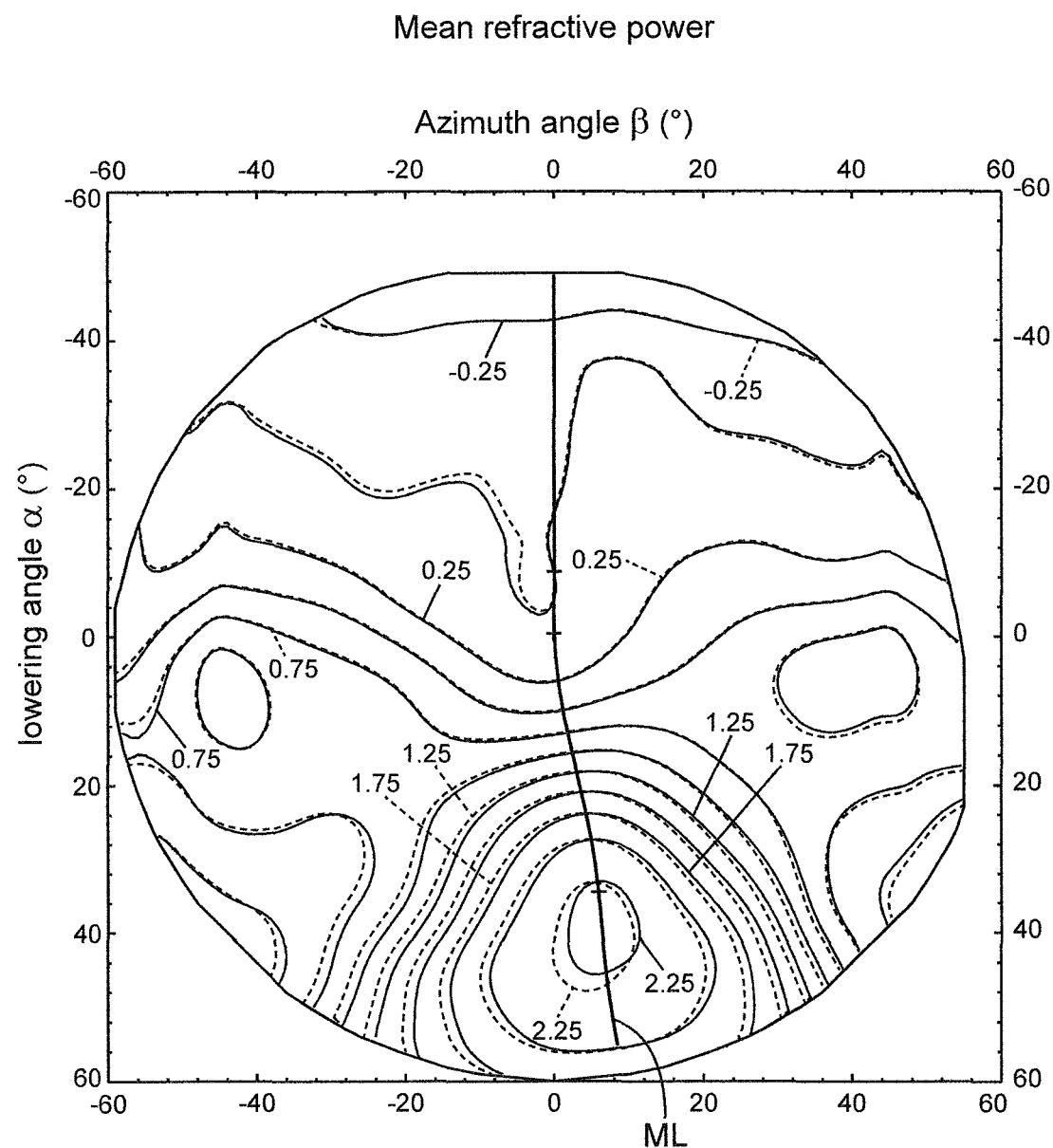
FIGS. 8a and 8b are maps of mean refractive power and resulting astigmatism respectively for a right lens having an initial design and a modified design according to an embodiment of the invention.
Figure 8B:
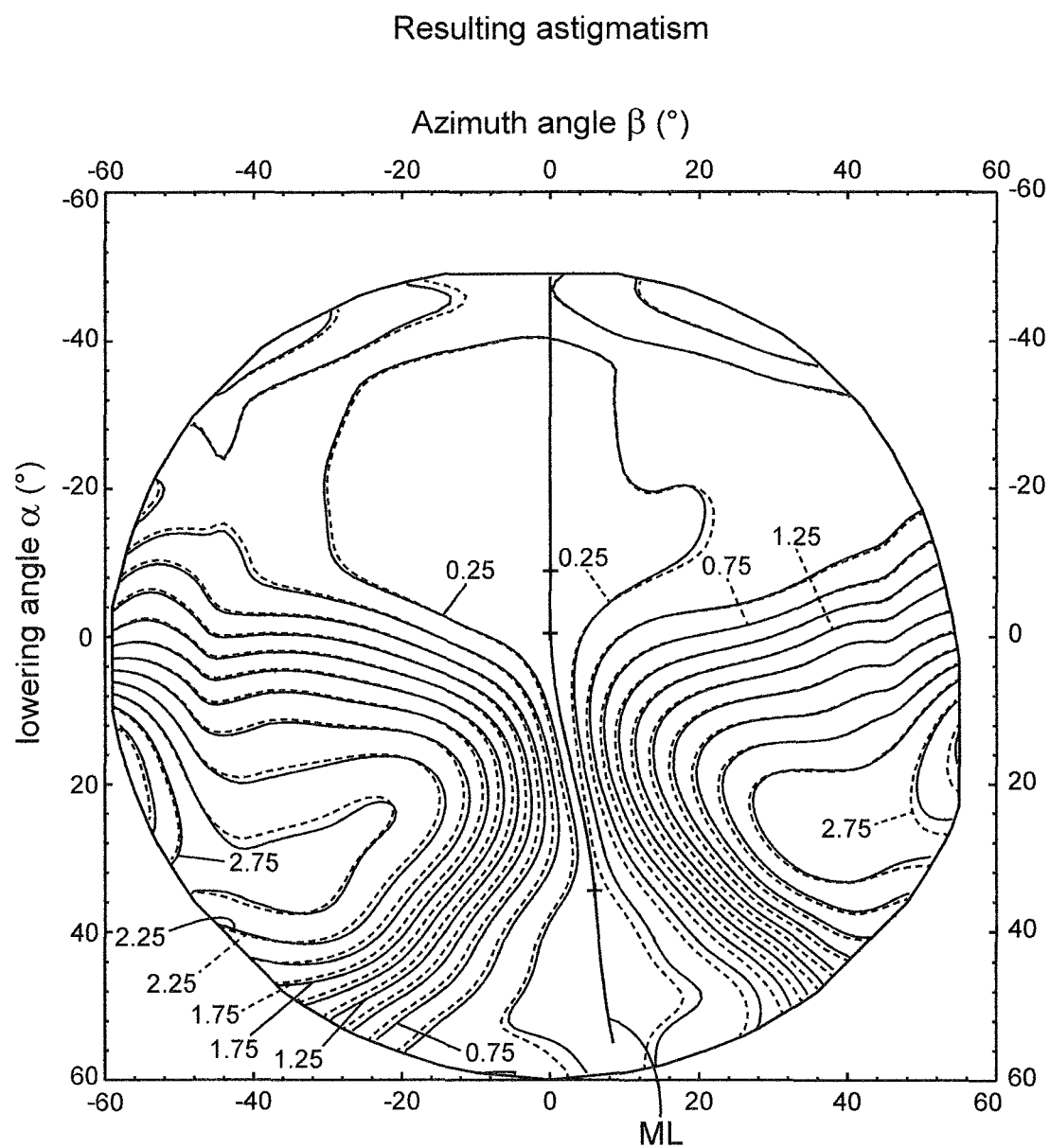

FIGS. 8a and 8b are maps of mean refractive power and resulting astigmatism respectively for a right lens having a prescribed far vision mean refractive power of 0 diopter and a prescribed addition ADD of 2.00 diopters, the initial design being represented by continuous lines.

Step c) further comprises a substep of, c2) from said distributions, and for a plurality of gaze directions intersecting the meridian line ML as existing before step c), at lowering angles $\alpha$, obtaining azimuth angles $\beta_{mer}(\alpha)$.

The azimuth angles $\beta_{mer}(\alpha)$ corresponding to the meridian line ML are obtained simply by reading the maps.

Step c) further comprises a substep of, c3) respectively for said gaze directions, that is to say for the gaze directions intersecting the meridian line ML as existing before step c), determining target azimuth angle values $\beta_{mer\_target}(\alpha)$ based on the convergence data $d_{conv}(d_{stim})$ provided at step b).

More precisely, from the azimuth angles $\beta_{mer}(\alpha)$ corresponding to the meridian line ML and from the map of mean refractive power, it is obtained the mean refractive power on the meridian line ML at lowering angles $\alpha$, which then gives directly the corresponding distance of the object point which is viewed sharply according to the following formula:

$$d_{stim}(\alpha)=1/(PPO(\alpha, \beta_{mer}(\alpha))-PPO(\text{far vision point}))+d_{erc\text{-}lens}$$

where $PPO(\alpha, \beta)$ is the mean refractive power of the lens for direction $(\alpha, \beta)$ and $d_{erc\text{-}lens}$ is the distance from the eye rotation center to the back surface of the lens.

This object point is to be identified with the visual stimulus, so that the visual stimulus distance $d_{stim}$ is the sharp vision distance through the initial design.

In a variant, the distance of the object point, and thus $d_{stim}$, is obtained from an ergorama and from the lowering angle $\alpha$ corresponding to the azimuth angle $\beta_{mer}(\alpha)$ on the meridian line ML. As explained above, an ergorama is a function associating the usual distance of an object point to each gaze direction and a gaze direction can be identified by a couple of angle values $(\alpha,\beta)$.

Next, from the visual stimulus distance $d_{stim}$ and from the convergence data $d_{conv}(d_{stim})$ provided at step b), it is obtained the convergence distance $d_{conv}$.

Figure 9:
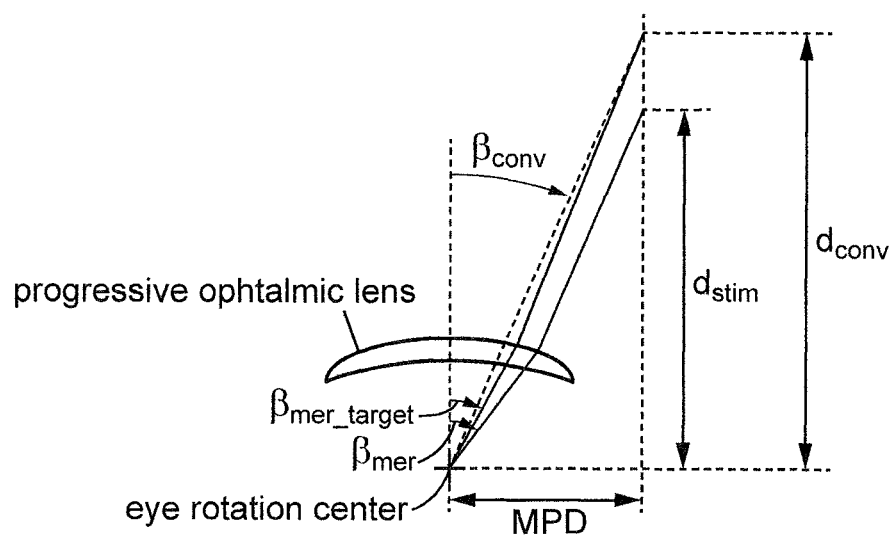
FIG. 9 is a schematic view showing how a target azimuth angle is determined for a wearer having a delay of convergence.

Then, target azimuth angle values $\beta_{mer\_target}(\alpha)$ are determined by ray tracing as illustrated on FIG. 9, taking into account standard or customized wearing conditions. The ray originates at the eye rotation center with a lowering angle $\alpha$, passes through the lens and intersects the sagittal plane at a distance $d_{conv}$. The azimuth angle of this ray is $\beta_{mer\_target}$.

The customized wearing conditions comprise the distance between the back surface of the lens and the eye rotation center, the pantoscopic and wrap angles.

As shown, the ray tracing takes into account a gaze direction deviation produced by the progressive ophthalmic lens when matching the prescription.

In the case where the real convergence capacity of the wearer is measured in step b) with the wearer equipped with a progressive ophthalmic lens matching the prescription, then $\beta_{mer\_target}(\alpha)$ is equal to $\beta_{conv}$.

Step c) further comprises a substep of, c4) based on the initial design, forming a target design comprising, for a plurality of gaze directions $(\alpha, \beta)$, at least one of the following values:

a mean refractive power $PPO_{target}(\alpha, \beta)$ such that $PPO_{target}(\alpha, \beta)=PPO(\alpha, \beta-\beta_{mer\_target}(\alpha)+\beta_{mer}(\alpha))$; and a module of resulting astigmatism $ASR_{target}(\alpha, \beta)$ such that $ASR_{target}(\alpha, \beta)=ASR(\alpha, \beta-\beta_{mer\_target}(\alpha)+\beta_{mer}(\alpha))$.

Such design transformation performs a lateral shift for each gaze direction, the lateral shift being dependant on the lowering angle value, so that the meridian line is moved from its position in the initial design to a new position corresponding to the convergence data collected for the wearer.

Then, step c) comprises implementing an optimization process for determining a test lens corresponding to the above target design.

In particular, step c) comprises a substep of c5) optimizing a test lens design with respect to the target design, and the test lens design as resulting from optimization forms the modified design. In other words, optimization consists in providing a test lens, which may be equal to the initial lens but not necessarily, and then modifying the test lens in order to minimize the difference between the design of the test lens and the target design. The test lens resulting from this optimization forms the customized lens.

Figure 10A:
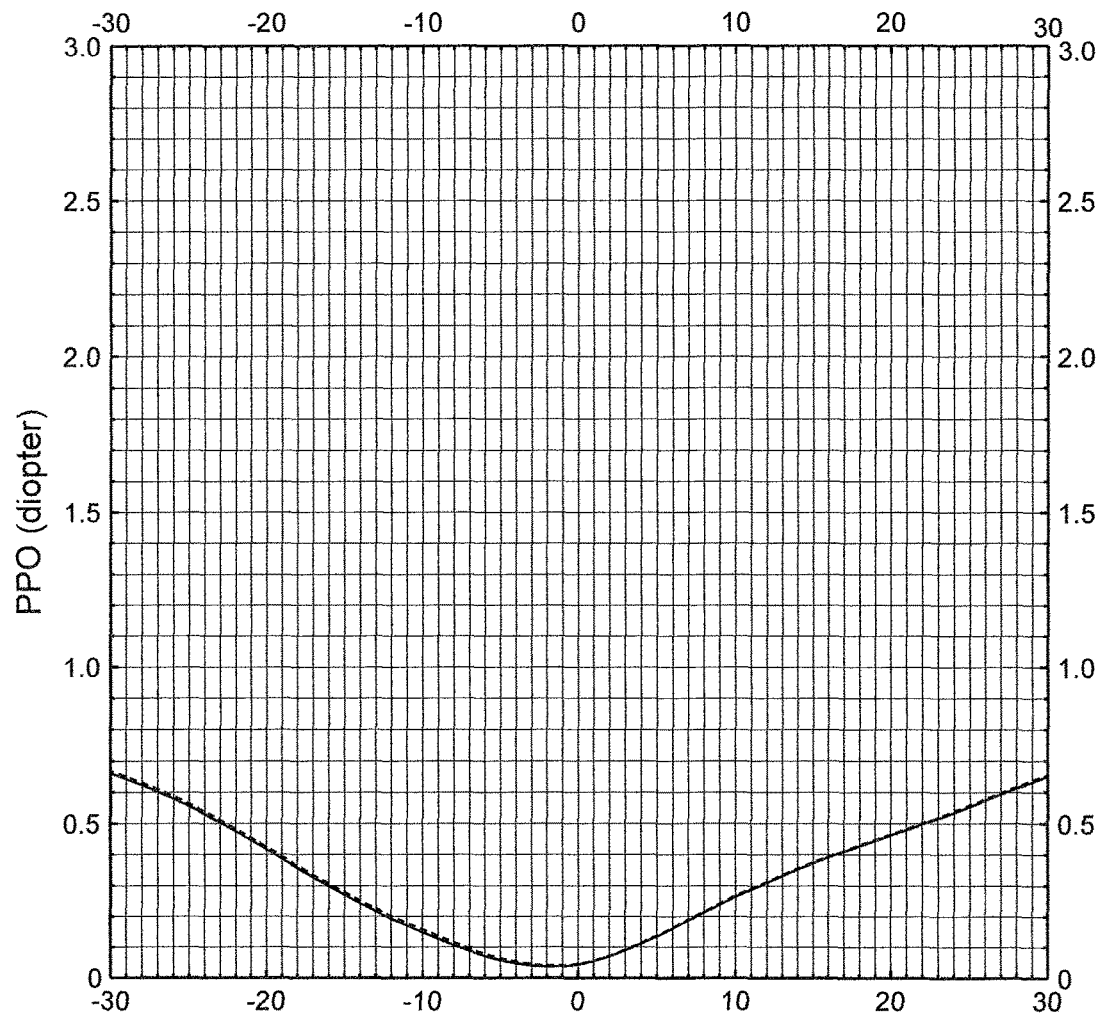
FIGS. 10a and 10b are graphs illustrating a mean refractive power and resulting astigmatism respectively as a function of an azimuth angle and at a lowering angle equal to 0°, for the initial and modified designs of FIGS. 8a and 8b.
Figure 10B:
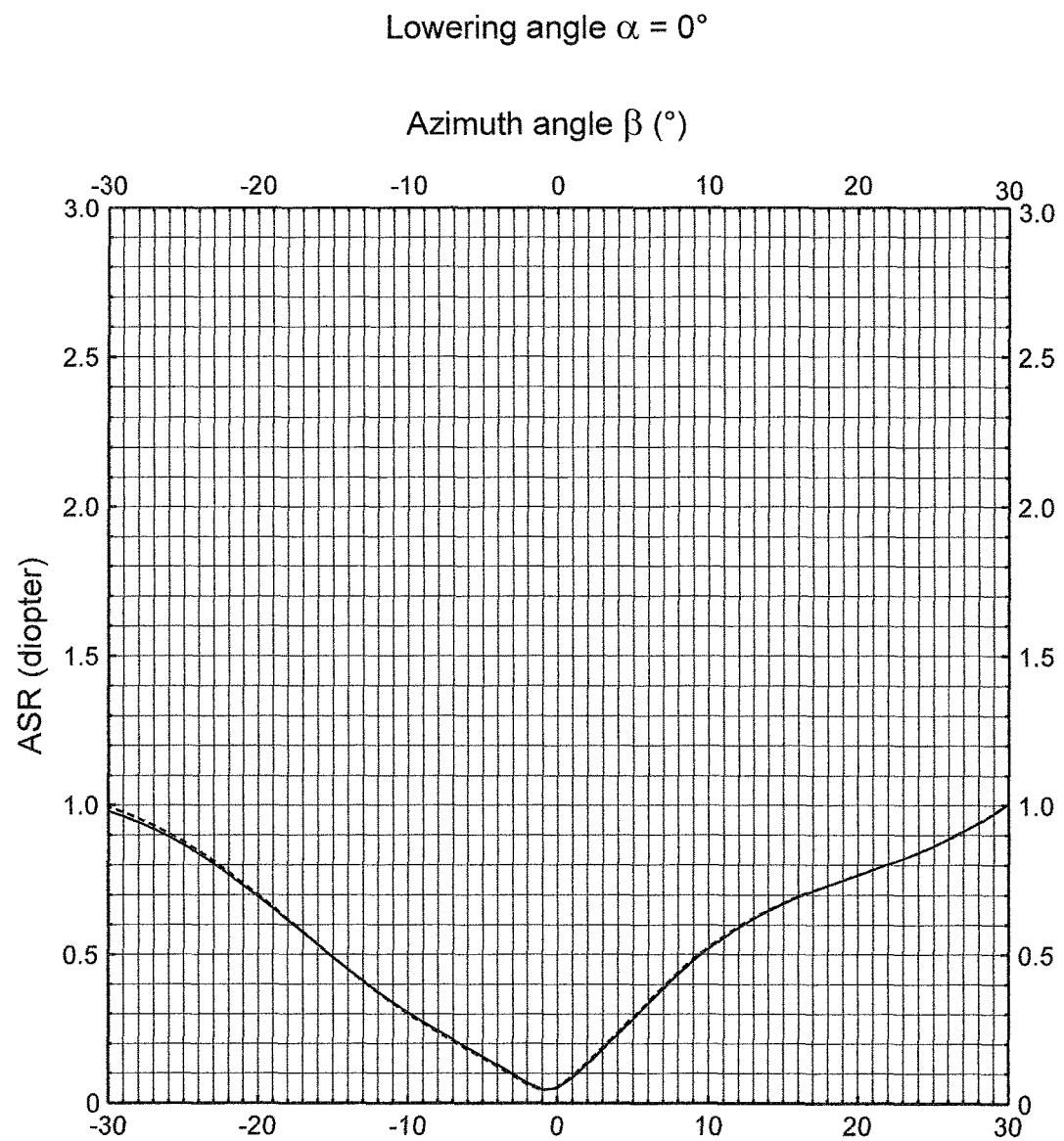
Figure 11A:
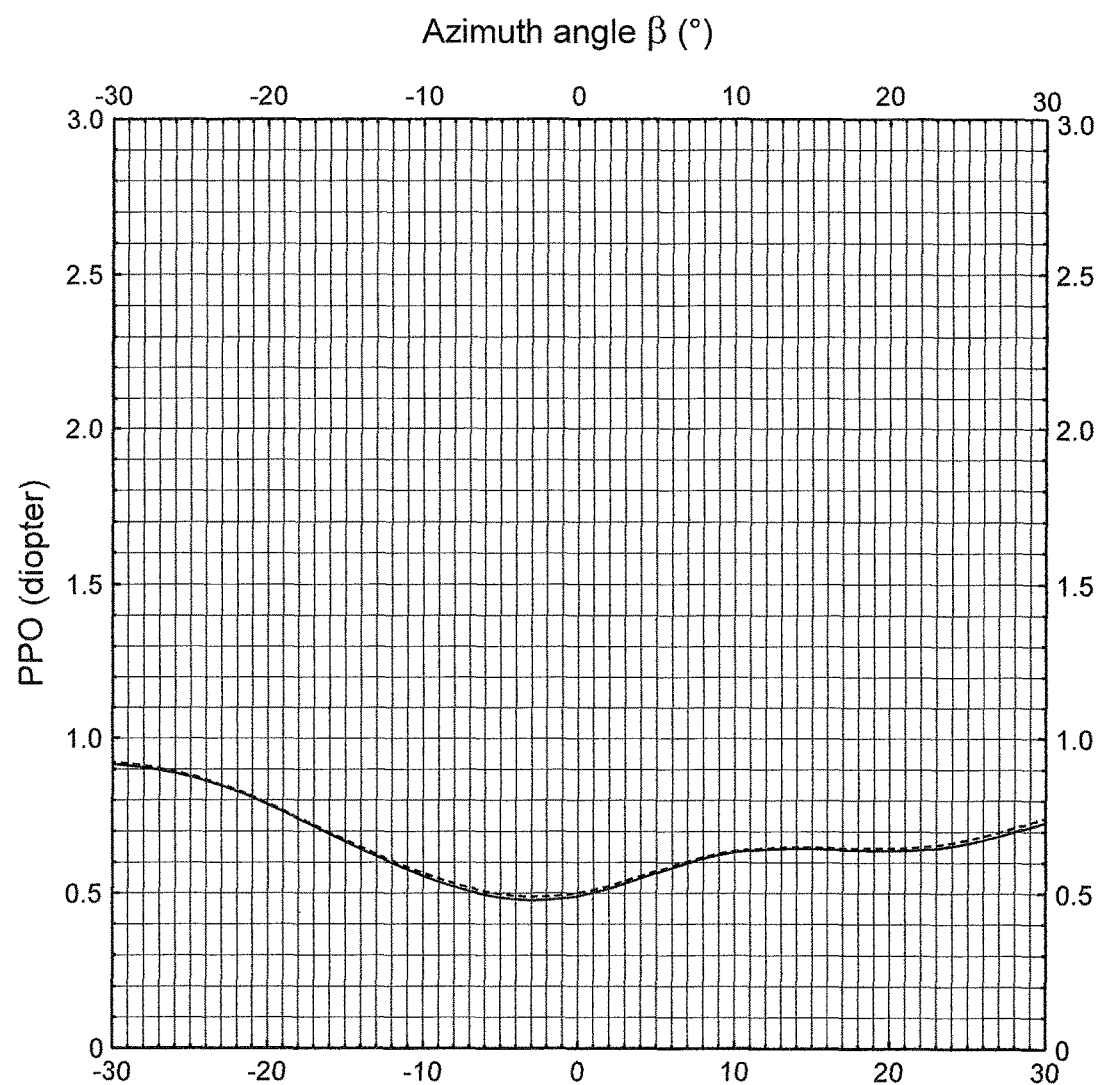
FIGS. 11a-13b are graphs identical to graphs of FIGS. 10a and 10b at a lowering angle equal to 10°, 20° and 30° respectively.
Figure 11B:
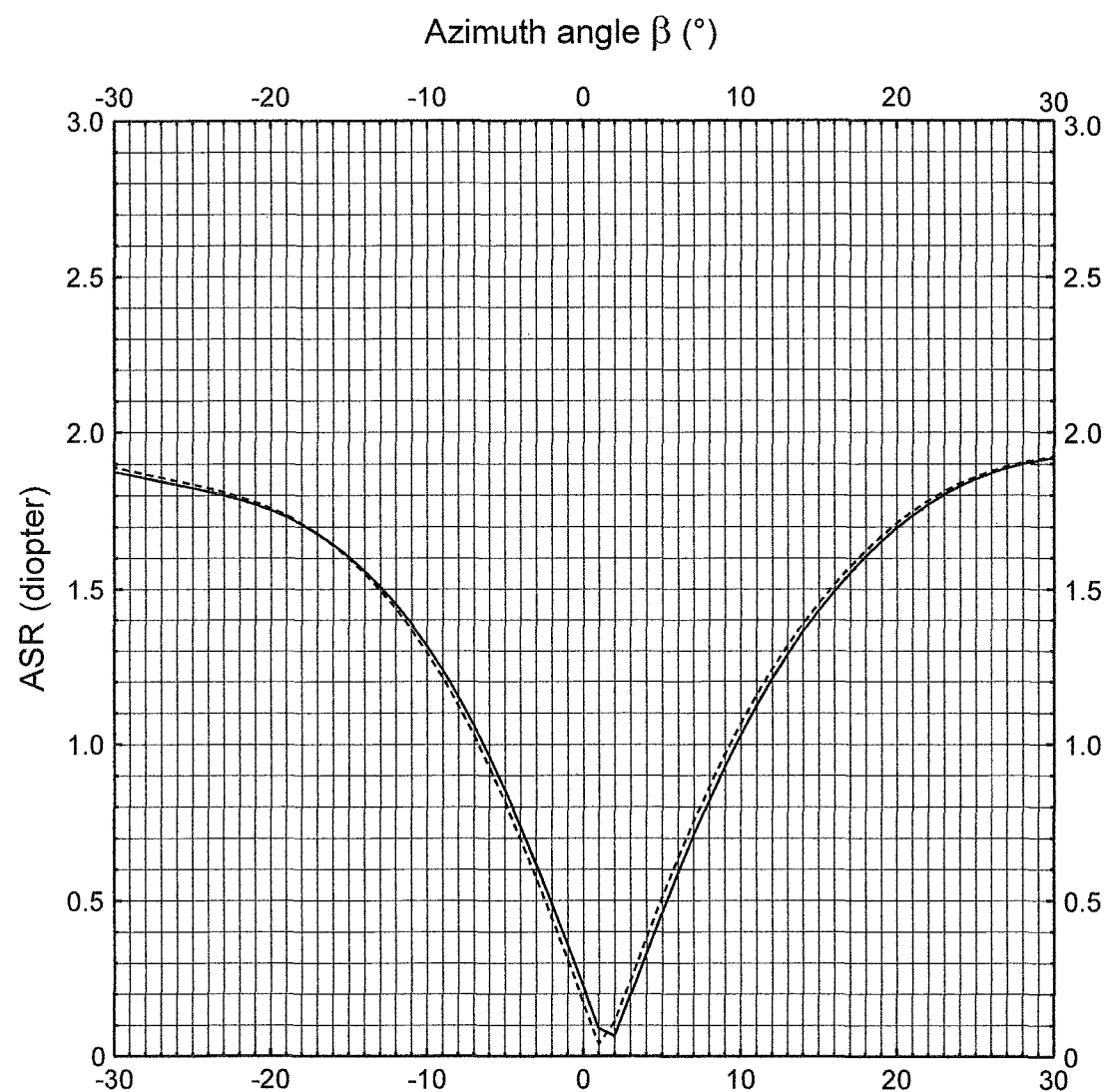
Figure 12A:
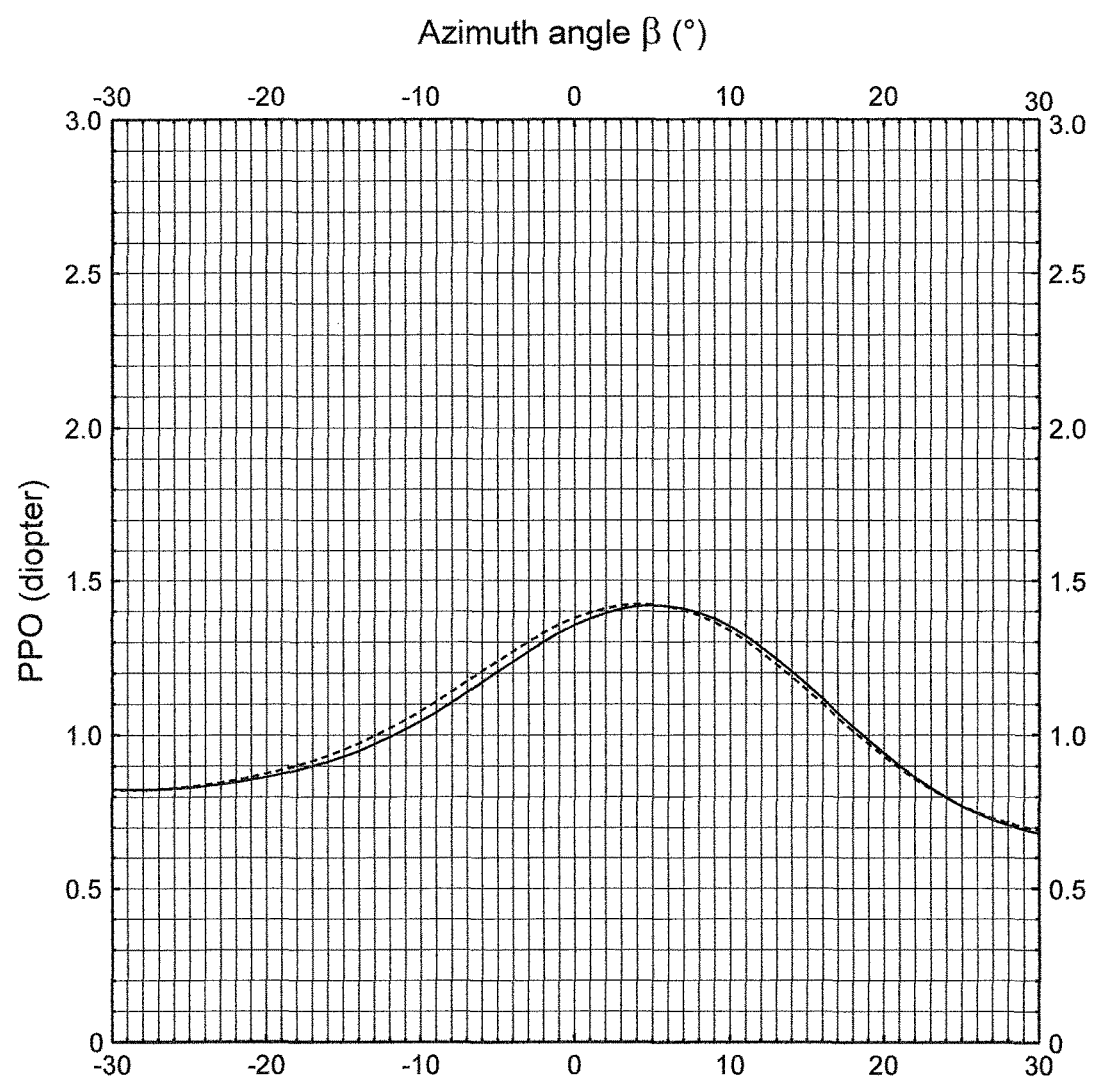
Figure 12B:
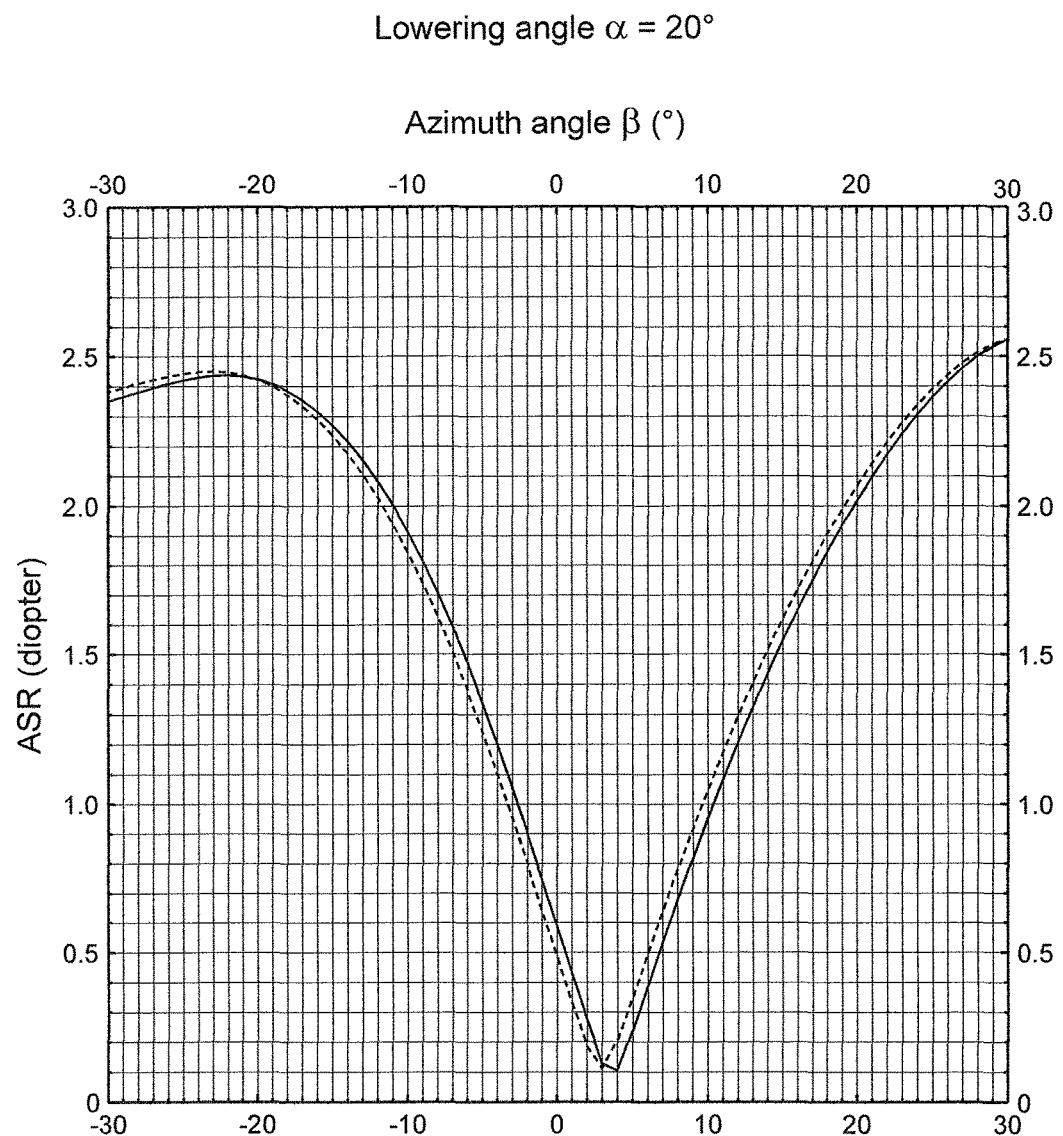
Figure 13A:
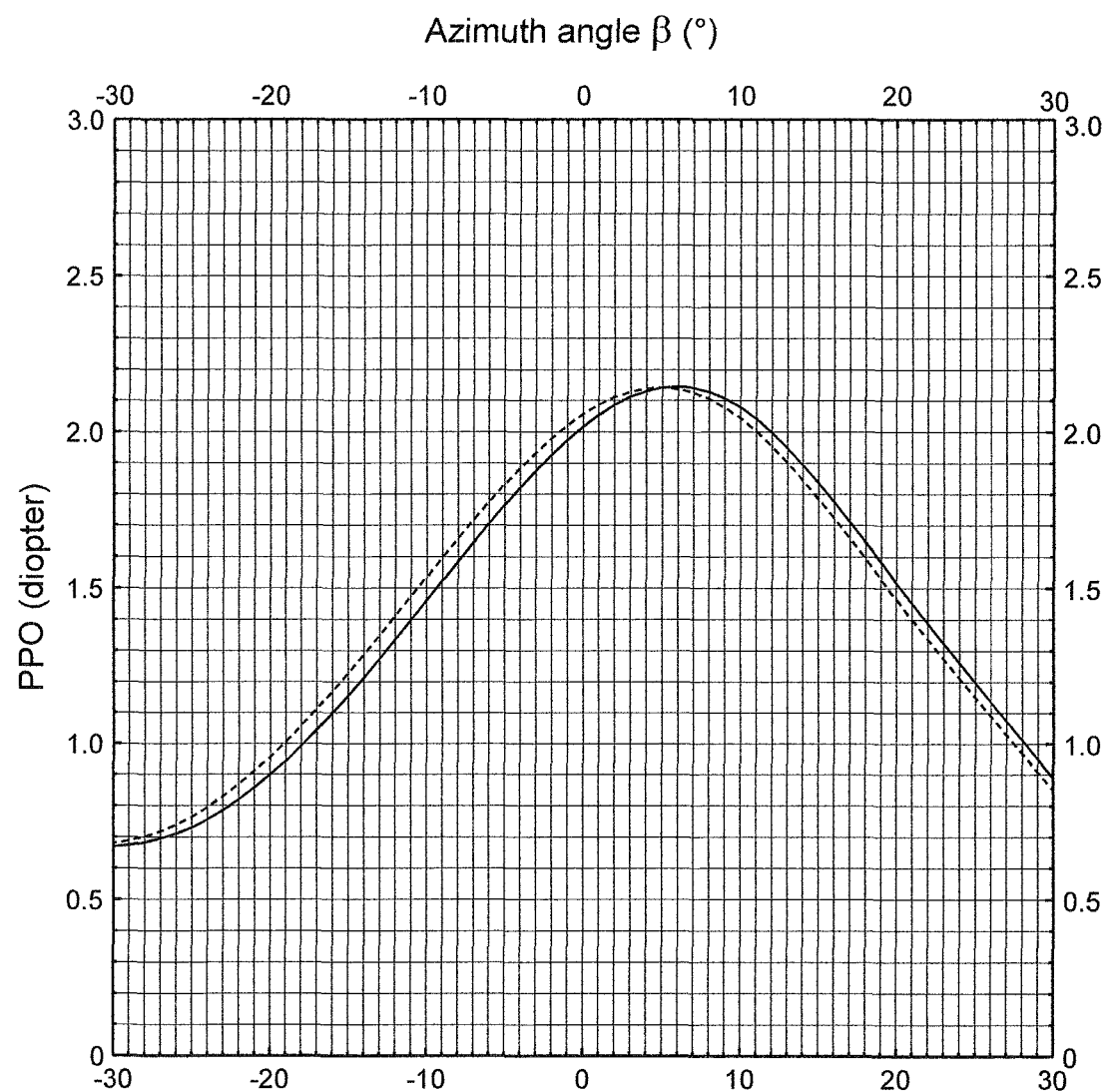
Figure 13B:
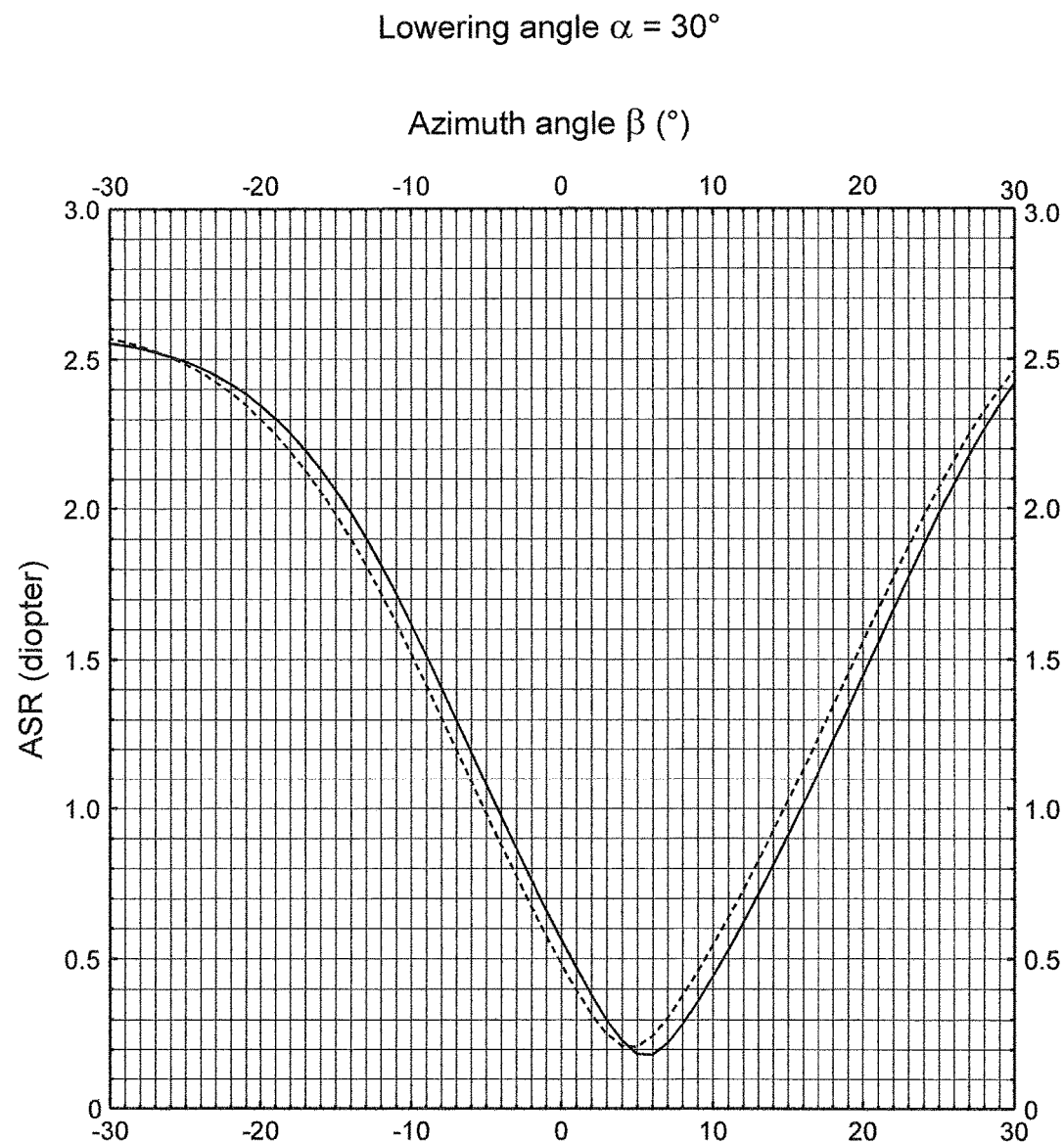

The distributions of mean refractive power and resulting astigmatism for the modified design are represented in dotted lines on FIGS. 10a and 10b respectively, corresponding to the initial design also represented on the same figures. Lateral shift of the isocurves as resulting from the invention can be observed for positive lowering angle values.

FIGS. 10a and 10b are graphs illustrating the mean refractive power and resulting astigmatism respectively as a function of an azimuth angle β and at a lowering angle α equal to 0°, for the initial (continuous line) and modified (dotted line) designs.

FIGS. 11a-13b are graphs identical to graphs of FIGS. 10a and 10b at a lowering angle α equal to 10°, 20° and 30° respectively.

The method may finally comprise a step of d) manufacturing the customized progressive ophthalmic lens based on the customized lens design.

The invention has special interest for wearers who have enough convergence ability, in particular to wearers having a convergence capacity considered as normal.

The convergence capability can be assessed by the Punctum Proximum of Convergence (PPC) measurement. Break value is the distance, in the sagittal plane of the wearer, between the root of the nose and the nearest point which can be seen binocularly, and Recovery value is the distance where the eyes can recover binocular fixation.

So, implementing the invention for a wearer may be subjected to his break value being lower than a predetermined threshold value. Thus, measuring the wearer's break value may form an initial step of the invention method.

Usually, the convergence capability is considered as being normal when the break value is lower than or equal to 20 cm, from a clinical point of view, or below the individual distance for reading.

The invention thus proposes a method for producing a customized progressive ophthalmic lens intended for a wearer, ensuring that the spatial profile of the meridian line matches the actual convergence ability of the wearer, in order to improve the congruence of the visual fields and increase the visual comfort.

The invention claimed is:

1. A method for producing a customized progressive ophthalmic lens intended for a wearer having a prescription for a wearer's eye corresponding to said lens, the method comprising the following:
   providing an initial progressive ophthalmic lens design having a meridian line;
   providing binocular convergence data for the wearer;
   the providing of the binocular convergence data comprising the following:
      providing a visual stimulus in a sagittal plane of the wearer;
      moving the visual stimulus within the sagittal plane between a predetermined maximum distance and a predetermined minimum distance;
      determining, for each of a plurality of visual stimulus distances between the predetermined maximum and minimum distances, an azimuth angle existing for an ocular axis of the wearer's eye when the wearer is looking at the visual stimulus located at the visual stimulus distance; and
      calculating a convergence distance for each azimuth angle determined at the determining of the plurality of the azimuth angles,
   modifying the initial design so that the meridian line is laterally shifted in position with respect to the initial design, for matching the convergence data provided when calculating each convergence distance, for said prescription; and
   using the modified design as resulting from modifying the initial design to manufacture the customized lens,
   wherein an assignment of each convergence distance to the corresponding visual stimulus distance forms the convergence data used in the modifying of initial design.

2. The method according to claim 1, wherein the meridian line is laterally shifted in the modifying of initial design so as to intersect the ocular axis of the wearer's eye when the wearer is looking at the visual stimulus located at said visual stimulus distance, and the modified design for said visual stimulus distance produces a same mean refractive power as the mean refractive power produced at a gaze direction intersecting the meridian line, by the initial design for said visual stimulus distance.

3. The method according to claim 1, wherein the determining of the plurality of visual stimulus distances is carried out with the wearer being devoid of ophthalmic lens, and the modifying of initial design includes taking into account a gaze direction deviation produced by the progressive ophthalmic lens when matching the prescription.

4. The method according to claim 1, wherein the moving of said visual stimulus comprises varying a height of the visual stimulus in the sagittal plane as a function of at least said visual stimulus distance.

5. The method according to claim 1, wherein the predetermined maximum distance is substantially equal to 2 m and the predetermined minimum distance is substantially equal to 20 cm.

6. The method according to claim 1, wherein the moving of said visual stimulus is performed at a constant speed during the moving of the visual stimulus within the sagittal plane.

7. The method according to claim 1, wherein the moving of said visual stimulus is performed at a speed comprised between 0.05 m/s and 0.3 m/s.

8. The method according to claim 1, wherein the modifying of initial design comprises implementing an optimization process for shifting the meridian line laterally from the initial design.

9. The method according to claim 1, wherein the modifying of initial design comprises the following:
   for the initial design, obtaining respective distributions for a mean refractive power PPO($\alpha$, $\beta$) and a module of resulting astigmatism ASR($\alpha$, $\beta$);
   from said distributions, and for a plurality of gaze directions intersecting the meridian line as existing before the modifying of initial design, at lowering angles $\alpha$, obtaining azimuth angles $\beta$mer($\alpha$);
   respectively for said gaze directions, determining target azimuth angle values based on the convergence data provided at the providing of binocular convergence data;
   based on the initial design, forming a target design comprising, for a plurality of gaze directions ($\alpha$, $\beta$), at least one of the following values:
   a mean refractive power PPOtarget($\alpha$, $\beta$) such that PPOtarget($\alpha$, $\beta$)=PPO($\alpha$, $\beta$–$\beta$mer_target($\alpha$)+$\beta$mer($\alpha$)); and
   a module of resulting astigmatism ASRtarget($\alpha$, $\beta$) such that
   ASRtarget($\alpha$, $\beta$)=ASR($\alpha$, $\beta$–$\beta$mer_target($\alpha$)+$\beta$mer($\alpha$)); and
   optimizing a test lens design with respect to the target design, and the test lens design as resulting from optimization forming the modified design.

10. The method according to claim 1, wherein the meridian line of the initial design is determined from a set of gaze directions through a progressive ophthalmic lens which is provided with said initial design, where a module of resulting astigmatism is minimum when varying an azimuth angle $\beta$ at constant lowering angle $\alpha$.

11. The method according to claim 1, wherein the method comprises initially measuring the wearer's break value and comparing the wearer's break value to a predetermined threshold, performing the providing of the initial progressive ophthalmic lens design, the providing of binocular convergence data, and the modifying of the initial design if the wearer's break value is lower than or equal to the predetermined threshold.

12. A method for manufacturing a customized pair of progressive ophthalmic lenses intended for a wearer having a prescription for each eye, wherein the method according to claim 1 is performed for each lens of the pair separately.

13. A customized progressive ophthalmic lens manufactured by the method according to claim 1.

* * * * *